United States Patent
Tzou et al.

(10) Patent No.: US 9,841,785 B2
(45) Date of Patent: Dec. 12, 2017

(54) ELECTRONIC DEVICE

(71) Applicants: Jyh-Chyang Tzou, Taipei (TW); Tsai-Wen Mao, Taipei (TW); Yao-Tsung Yeh, Taipei (TW); Huai-Te Tseng, Taipei (TW); Chia-Chi Sun, Taipei (TW); Ming-Chung Peng, Taipei (TW); Yung-Hsiang Chen, Taipei (TW); Chien-I Lin, Taipei (TW); Hsin-Hui Huang, Taipei (TW); Chien-Chia Huang, Taipei (TW); Tsung-Han Yang, Taipei (TW)

(72) Inventors: Jyh-Chyang Tzou, Taipei (TW); Tsai-Wen Mao, Taipei (TW); Yao-Tsung Yeh, Taipei (TW); Huai-Te Tseng, Taipei (TW); Chia-Chi Sun, Taipei (TW); Ming-Chung Peng, Taipei (TW); Yung-Hsiang Chen, Taipei (TW); Chien-I Lin, Taipei (TW); Hsin-Hui Huang, Taipei (TW); Chien-Chia Huang, Taipei (TW); Tsung-Han Yang, Taipei (TW)

(73) Assignee: COMPAL ELECTRONICS, INC., Taipei (TW)

( * ) Notice: Subject to any disclaimer, the term of this patent is extended or adjusted under 35 U.S.C. 154(b) by 98 days.

(21) Appl. No.: 14/864,880

(22) Filed: Sep. 25, 2015

(65) Prior Publication Data

US 2016/0091927 A1 Mar. 31, 2016

Related U.S. Application Data

(60) Provisional application No. 62/055,650, filed on Sep. 26, 2014.

(51) Int. Cl.
*H05K 7/00* (2006.01)
*G06F 1/16* (2006.01)
*G06F 3/02* (2006.01)

(52) U.S. Cl.
CPC .......... *G06F 1/1632* (2013.01); *G06F 1/1626* (2013.01); *G06F 1/1654* (2013.01); *G06F 1/1681* (2013.01); *G06F 3/0202* (2013.01)

(58) Field of Classification Search
CPC ....................................................... G06F 1/16
(Continued)

(56) References Cited

U.S. PATENT DOCUMENTS 6,530,784 B1 * 3/2003 Yim ...................... G06F 1/1616
361/679.29

FOREIGN PATENT DOCUMENTS

TW 201520723 6/2015

* cited by examiner

*Primary Examiner* — Jerry Wu
(74) *Attorney, Agent, or Firm* — JCIPRNET

(57) ABSTRACT

An electronic device includes a first machine body and a second machine body adapted to be detachably assembled to the first machine body. The first machine body includes a first casing, a first hinge fixed to a side of the first casing, a second hinge pivoted to the first hinge along an axis, and a first connecting member disposed at the side and linked to the second hinge. The first and the second hinges are covered by the first casing. The second machine body includes a second casing and a second connecting member. When the first machine body is assembled to the second machine body, the first connecting member is fixed to the second connecting member, the second hinge is fixed jointly so that the first hinge is rotatable related to the second hinge. Accordingly, the first casing is rotatable related to the second casing.

10 Claims, 16 Drawing Sheets

(58) Field of Classification Search
USPC .................................................. 361/679.01
See application file for complete search history.

ELECTRONIC DEVICE

CROSS-REFERENCE TO RELATED APPLICATION

This application claims the priority benefits of U.S. provisional application Ser. No. 62/055,650, filed on Sep. 26, 2014. The entirety of the above-mentioned patent application is hereby incorporated by reference herein and made a part of this specification.

BACKGROUND OF THE INVENTION

1. Field of the Invention

The invention relates to an electronic device, and particularly relates to an electronic device having detachable machine bodies.

2. Description of Related Art

Through the continuous development of science and technology, many portable electronic devices, such as laptop computers, smart phones, and tablet computers, hit the market one after another. Users may receive and send information anytime anywhere by using these portable electronic devices. Thus, these portable electronic devices have become an indispensable part of the daily life of modern people. Currently, there is another type of electronic devices on the market. An electronic device of this type is forming of a tablet computer and an expansion dock, and the tablet computer and the expansion dock may be assembled to or detached from each other. Based on the user's needs, the electronic device may serve as a tablet computer or a notebook computer.

Among the electronic devices that include a tablet computer and an expansion dock, some of the products on the market provide a recess on the expansion dock, and the tablet computer is directly inserted into the recess and stands on the expansion dock. However, in such electronic device, the angle of the tablet computer on the expansion dock cannot be adjusted, making it less convenient to use. Another type of products provides a pivotally rotatable casing stand on the expansion dock, the tablet computer may be inserted into the casing stand to make the tablet computer rotatable relative to the expansion dock. However, the expansion dock having the casing stand is larger in size and is less compact in appearance. Also, the casing stand remains rotatable relative to the expansion dock whether the tablet computer is inserted into the casing stand or not. Thus, the casing stand may rotate arbitrarily when the expansion dock being carried.

SUMMARY OF THE INVENTION

The invention provides an electronic device. When a first machine body of the electronic device not assembled to the second machine body, a first hinge and a second hinge of the first machine body do not rotate, and when the first machine body is assembled to the second machine body, the first hinge rotates relative to the second hinge.

An electronic device according to the embodiments of the invention includes a first machine body and a second machine body suitable to be detachably assembled to the first machine body. The first machine body includes a first casing, a first hinge, a second hinge, and a first connecting member. The first hinge is fixed to a side of the first casing. The second hinge is pivoted to the first hinge along an axis. The first hinge and the second hinge are covered by the first casing. The first connecting member is located at the side of the first casing and linked to the second hinge. The second machine body includes a second casing and a second connecting member disposed at the second casing. When the first machine body is assembled to the second machine body, the first connecting member is fixed by the second connecting member, and the second hinge is fixed jointly, such that the first hinge is suitable for rotating relative to the second hinge, making the first casing suitable for rotating relative to the second casing.

According to an embodiment of the invention, one of the first machine body and the second machine body is a tablet computer, and the other of the first machine body and the second machine body is an expansion dock.

According to an embodiment of the invention, the first connecting member is located at one of a left end and a right end of the side of the first casing.

According to an embodiment of the invention, the first machine body further includes a fixing member fixed to the second hinge. The first connecting member is movably disposed to the fixing member along the axis, the first connecting member and the second connecting member are respectively two magnetic members attracting each other, and when the first machine body is assembled to the second machine body, the second connecting member attracts the first connecting member to fix relative positions of the first connecting member and the second machine body.

According to an embodiment of the invention, the second casing includes a recessed opening, the second connecting member is located beside the recessed opening, and when the first machine body is assembled to the second machine body, the first connecting member is inserted into the recessed opening and fastened to the second casing.

According to an embodiment of the invention, a shape of a cross section of the first connecting member includes a linear shape, a polygonal shape, and a semi-circular shape.

According to an embodiment of the invention, the first connecting member includes a first end and a second end opposite to each other, the first end is suitable to extend out of the first casing, and the first machine body further includes a restoring magnetic member disposed beside the second end. When the first machine body is detached from the second machine body, the restoring magnetic member attracts the first connecting member, and when the first machine body is assembled to the second machine body, a magnetic attraction force of the second connecting member with respect to the first connecting member is greater than a magnetic attraction force of the restoring magnetic member with respect to the first connecting member.

According to an embodiment of the invention, the first machine body further includes a first electrical terminal located at an outer side of the fixing member, the second machine body further includes a second electrical terminal located at the second casing at a position corresponding to the fixing member, and when the first machine body is assembled to the second machine body, the first electrical terminal is connected to the second electrical terminal.

According to an embodiment of the invention, the first machine body further includes the first electrical terminal located at the first connecting member, and the second machine body further includes the second electrical terminal located at the second connecting member.

According to an embodiment of the invention, the second machine body includes a button located on the second casing, and when the first machine body is assembled to the second machine body, the button is suitable to be pressed to the first connecting member to make the first connecting member detached from the second connecting member.

According to an embodiment of the invention, one of the first connecting member and the second connecting member includes a protrusion part protruding along the axis, and the other of the first connecting member and the second connecting member includes a recessed part corresponding to the protrusion part. When the first machine body is assembled to the second machine body, the first connecting member is fastened to the second connecting member, and the second hinge is jointly fixed, such that the first hinge is rotatable relative to the second hinge.

According to an embodiment of the invention, a shape of a cross section of the protrusion part includes a linear shape, a polygonal shape, and a semi-circular shape.

According to an embodiment of the invention, the first connecting member includes a slot, and the second connecting member includes a locking hook. The second connecting member is pivoted to the second casing, and the second connecting member is suitable to be rotated from inside of the second casing to a position protruding out of the second casing, so as to be inserted into the first connecting member.

According to an embodiment of the invention, the first machine body further includes a first magnetic member, and the second machine body includes a rod, a second magnetic member, and a third magnetic member. When the first machine body is detached from the second machine body, the second connecting member, the rod, the second magnetic member, and the third magnetic member are sequentially located on the same axis in order, and the second magnetic member is attracted by the third magnetic member. When the first machine body is assembled to the second machine body, a magnetic attraction force between the first magnetic member and the second magnetic member is greater than a magnetic attraction force between the second magnetic member and the third magnetic member, such that the second magnetic member moves toward the rod, and the rod pushes the second connecting member, making the second connecting member rotate and be inserted into the first connecting member, thereby fixing the second connecting member to the first connecting member.

According to an embodiment of the invention, one of a left end and a right end of the side of the first casing includes a positioning part, and the second casing includes a fixing groove corresponding to the positioning part.

According to an embodiment of the invention, the positioning part includes a spherical bump located at the center and a peripheral area located at a periphery of the spherical bump, and the spherical bump is suitable to rotate relative to the peripheral area.

According to an embodiment of the invention, the positioning part further includes a guiding bump at the peripheral area, the second casing further includes a guiding track connected to the fixing groove, and the first machine body is suitable to be assembled to the second machine body along an extending direction of the guiding track.

According to an embodiment of the invention, a width of the guiding bump gradually decreases toward the spherical bump.

According to an embodiment of the invention, the first machine body further includes a first electrical connector including a casing stand and a first electrical terminal not covered by the casing stand. The first electrical connector is pivoted to the first casing and suitable for rotating relative to the first casing, and the second machine body includes a second electrical connector including a second electrical terminal.

According to an embodiment of the invention, the first machine body further includes a holding member, and the holding member is fixed inside the first casing and located beside the first electrical connector. The first electrical connector further includes a recess recessed in the casing stand and a first fastening part pivotally disposed at the casing stand. The holding member includes a second fastening part, and the second electrical connector further includes a pressing part. When the first machine body is detached from the second machine body, the first fastening part is fastened to the second fastening part, and the first electrical connector is fixed to the holding member, and when the first machine body is assembled to the second machine body, the pressing part is inserted into the recess and pressed to the first fastening part, and the first fastening part rotates to be detached from the second fastening part, such that the first electrical connector is suitable for rotating relative to the holding member.

Based on above, the first hinge and the second hinge of the first machine body of the electronic device according to the embodiments of the invention are covered by the first casing. When the first machine body is not combined to the second machine body, the first hinge and the second hinge do not rotate relative to each other due to a friction force between the first hinge and the second hinge. After the first machine body is assembled to the second machine body, since the first connecting member of the first machine body is fixed by the second connecting member, the second hinge is jointly fixed. Under such circumstance, when the user exerts a force to rotate the first casing and overcomes the friction force between the first hinge and the second hinge, the first hinge may rotate relative to the second hinge, such that the first casing may rotate relative to the second casing. In other words, the first hinge and the second hinge are rotatable relative to each other when the first machine body of the electronic device according to the embodiments of the invention is assembled to the second machine body. Therefore, when the first machine body of the electronic device according to the embodiments of the invention is not assembled to the second machine body, the first hinge and the second hinge do not arbitrarily rotate. In addition, since the first hinge and the second hinge are covered by the first casing, the appearance of the first machine body is more compact.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the disclosure.

DESCRIPTION OF THE EMBODIMENTS

Figure 1:
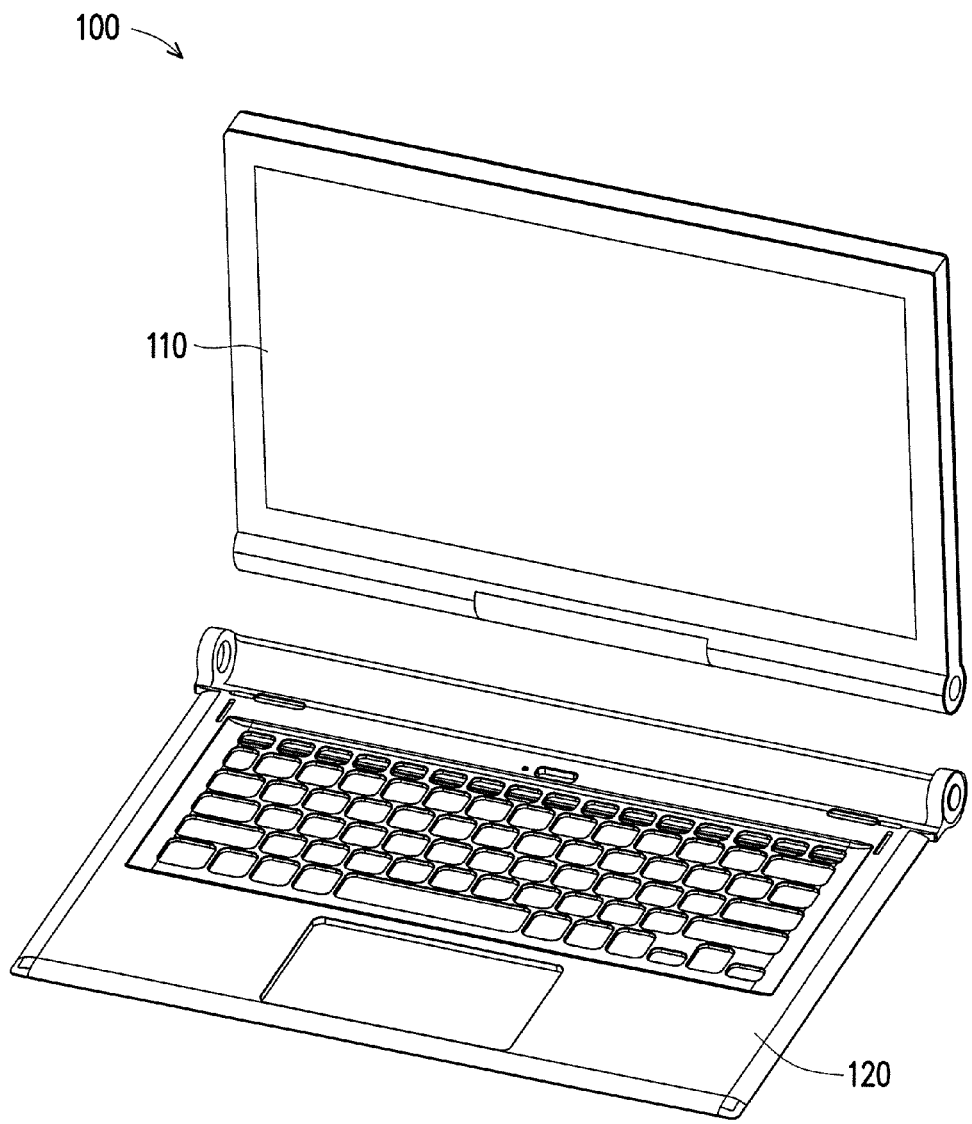
FIG. 1 is a schematic view illustrating an electronic device, where a first machine body is detached from a second machine body, according to an embodiment of the invention.

Reference will now be made in detail to the embodiments of the disclosure, examples of which are illustrated in the accompanying drawings. Wherever possible, the same reference numbers are used in the drawings and the description to refer to the same or like parts.

Figure 2:
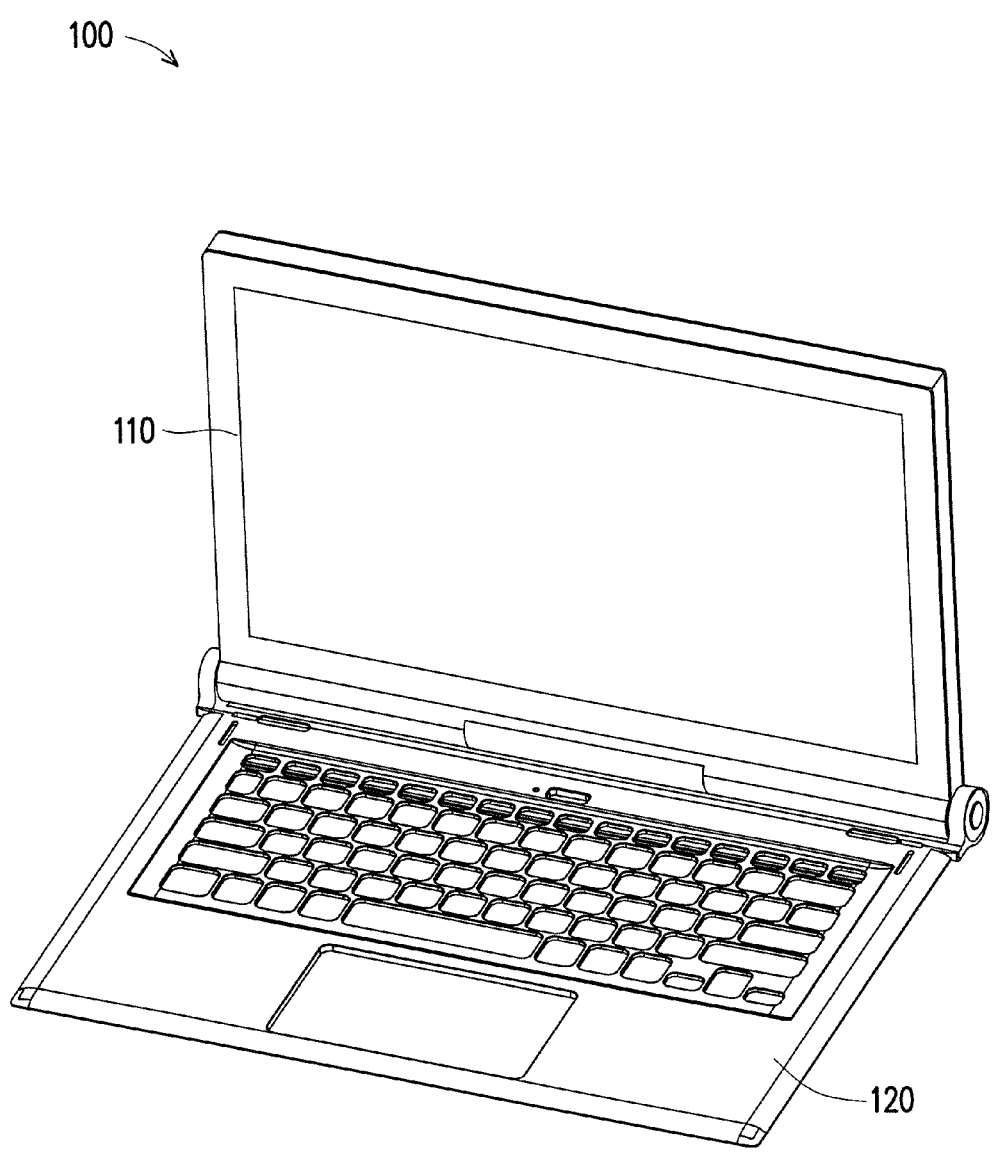
FIG. 2 is a schematic view illustrating the electronic device shown in FIG. 1, where the first machine body is assembled to the second machine body.

FIG. 1 is a schematic view illustrating an electronic device, where a first machine body is detached from a second machine body, according to an embodiment of the invention. FIG. 2 is a schematic view illustrating the electronic device shown in FIG. 1, where the first machine body is assembled to the second machine body. Referring to FIGS. 1 and 2, an electronic device 100 of this embodiment includes a first machine body 110 and a second machine body 120. In this embodiment, the first machine body 110 is a tablet computer, and the second machine body 120 is an expansion dock. However, the types of the first machine body 110 and the second machine body 120 are not limited thereto, for example, they can be 2 housings that can be assembled together for rotation purpose. As shown in FIGS. 1 and 2, in this embodiment, the first machine body 110 may be detachably assembled to the second machine body 120. The user may choose to use the electronic device 100 as a tablet computer or a notebook computer.

Figure 3:
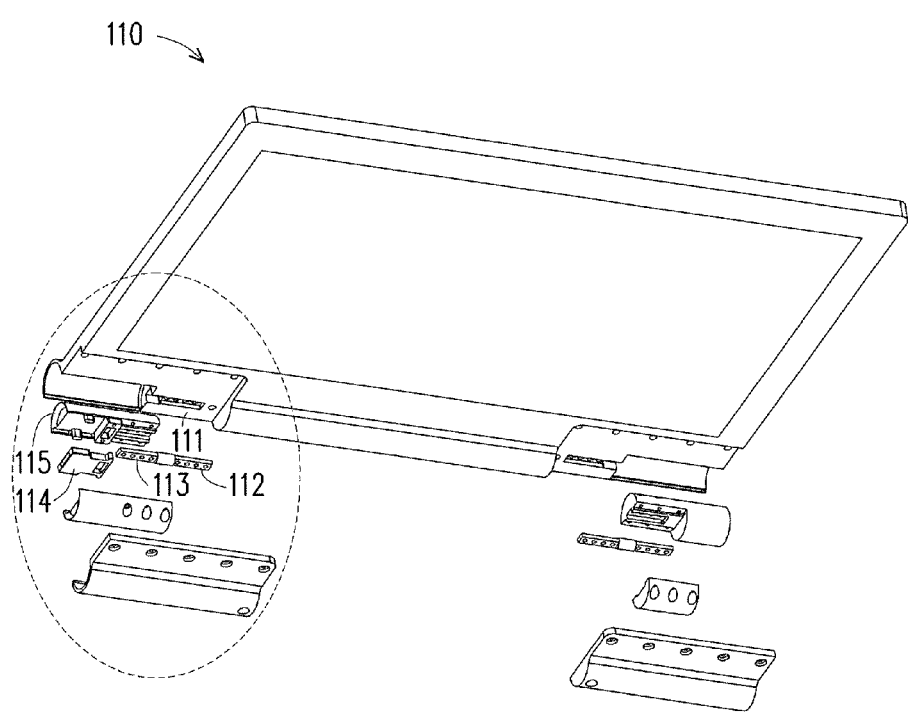
FIG. 3 is a schematic partial exploded view illustrating the first machine body of the electronic device shown in FIG. 1.
Figure 4:
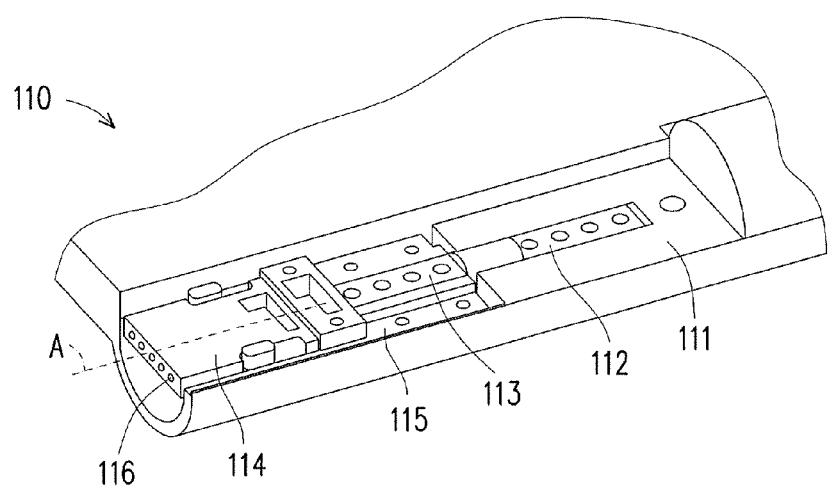
FIG. 4 is a schematic partial view illustrating the first machine body shown in FIG. 1.

FIG. 3 is a schematic partial exploded view illustrating the first machine body of the electronic device shown in FIG. 1. FIG. 4 is a schematic partial view illustrating the first machine body shown in FIG. 1. In FIG. 4, a portion of a casing of the first machine body is intentionally removed to illustrate components therein for description. Referring to FIGS. 3 and 4, the first machine body 110 includes a first casing 111, a first hinge 112, a second hinge 113, a first connecting member 114, and a fixing member 115. The first hinge 112 is fixed to a side of the first casing 111. The second hinge 113 is pivoted to the first hinge 112 along an axis A (shown in FIG. 4), and the first hinge 112 and the second hinge 113 are covered by the first casing 111. The fixing member 115 is fixed to the second hinge 113. The first connecting member 114 is located on the fixing member 115 and is movably disposed to the fixing member 115 along the axis A. The first connecting member 114 is limited by the fixing member 115 in a direction perpendicular to the axis A. Thus, the first fixing member 114 is only allowed to move on the axis A relative to the fixing member 115. In other directions, the first connecting member 114 is linked to the second hinge 113. In this embodiment, the fixing member 115 and the first connecting member 114 are respectively located at an end part of the first casing 111. Accordingly, the first connecting member 114 may extend out of the first casing 111 along the axis A.

In this embodiment, since the first hinge 112 and the second hinge 113 in the first machine body 110 are disposed in and covered by the first casing 111, when the first machine body 110 is not assembled to the second machine body 120, the first hinge 112 and the second hinge 113 do not rotate relative to each other.

Figure 5:
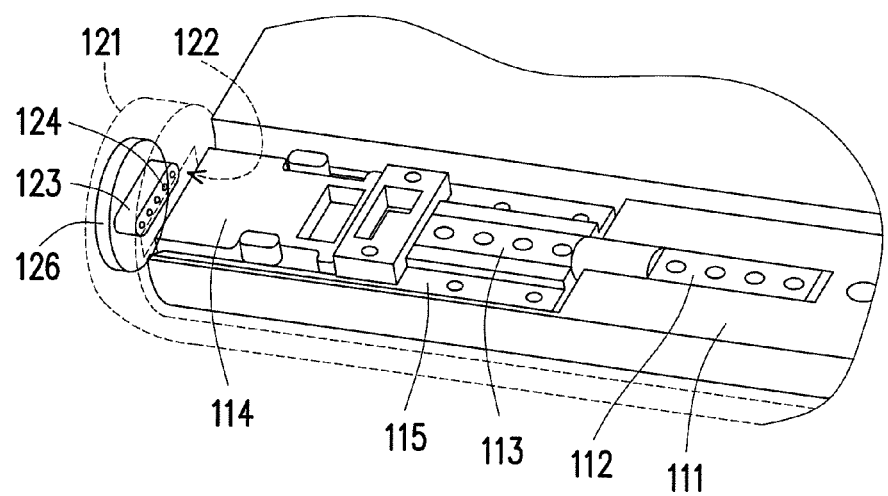
FIGS. 5 and 6 are schematic partial views illustrating a process of assembling the first machine body shown in FIG. 1 to the second machine body.
Figure 6:
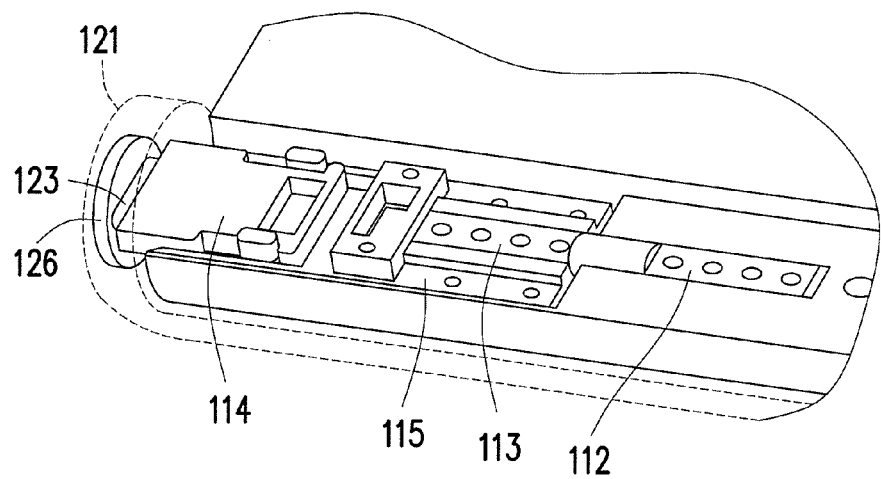

FIGS. 5 and 6 are schematic partial views illustrating a process of assembling the first machine body shown in FIG. 1 to the second machine body. It should be noted that, in FIGS. 5 and 6, a second casing of the second machine body is illustrated with dotted lines, so as to clearly distinguish the first machine body and the second machine body. Other components of the second machine body are still illustrated with solid lines.

Referring to FIG. 5, in this embodiment, the second machine body 120 includes a second casing 121 and a second connecting member 123 disposed at the second casing 121. An accommodating groove 127 is disposed at a position where the second casing 121 and the first casing 111 are connected, so as to accommodate a lower side (i.e., the side where the first hinge 112, the second hinge 113, the first connecting member 114, and the fixing member 115 are disposed) of the first casing 111. The second connecting member 112 is located at an end of the accommodating groove 127.

In this embodiment, the first connecting member 114 and the second connecting member 123 are respectively magnetic members attracting each other. As shown in FIGS. 5 and 6, when the first machine body 110 is assembled to the second machine body 120, the second connecting member 123 attracts the first connecting member 114. Accordingly the first connecting member 114 moves toward the left in the drawing to be fixed by the second connecting member 123. Thus, relative positions of the first connecting member 114 and the second machine body 120 are fixed. Since the movement of the first connecting member 114 is linked to the fixing member 115 in directions other than the direction of the axis A, and the fixing member 115 is fixed to the second hinge 113, the second hinge 113 is jointly fixed when the first connecting member 114 is fixed. Under such circumstance, the second hinge 113 is fixed, if the user exerts a force to rotate the first casing 111, the first hinge 112 may rotate relative to the second hinge 113 as long as the force exerted by the user to rotate the first casing 111 is greater than a friction force between the first hinge 112 and the second hinge 113. Accordingly, the first casing 111 is able to rotate relative to the second casing 121.

In other words, the first hinge 112 and the second hinge 113 are rotatable relative to each other when the first machine body 110 of this embodiment is assembled to the second machine body 120. Thus, when the first machine body 110 is not assembled to the second machine body 120, the first hinge 112 and the second hinge 113 do not arbitrarily rotate. In addition, the first hinge 112 and the second hinge 113 are covered in the first casing 111. Thus, the appearance of the first machine body 110 is more compact.

It should be noted that, in other embodiments, the first machine body 110 may also be an expansion dock, while the second machine body 120 may also be a tablet computer. The invention is not limited by the drawings.

In addition, in this embodiment, a shape of a cross section of the first connecting member 114 is a linear shape like a slim rectangular shape. The second casing 121 includes a recessed opening 122 in a position beside the second connecting member 123. A shape of the recessed opening 122 corresponds to the shape of the first connecting member 114. When the first machine body 110 is assembled to the second machine body 120, the first connecting member 114 is inserted into the recessed opening 122 and fastened to the second casing 123. Namely, in this embodiment, the first connecting member 114 is further fixed to the second casing 121 through mechanical fastening in addition to being fixed to the second connecting member 123 through magnetic attraction. Thus, a fixing effect is more desirable. Of course, in other embodiments, the components may also fixed only through magnetic attraction or mechanical fastening. The invention is not limited thereto.

Besides, in this embodiment, the second machine body 120 includes a button 126 located beside the second connecting member 123 and not covered by the second casing 121. When the first machine body 110 is assembled to the second machine body 120, the button 126 may be pressed to the second connecting member 123. The second connecting member 123 pushes the first connecting member 114 to be detached the recessed opening 122. At this time, the user may pull the first casing 111 upward to remove the first machine body 110 from the second machine body 120. Or, in other embodiments, the button 126 may not be linked to the second connecting member 123 but directly pressed to the first connecting member 114. The first connecting member 114 may then be detached from the second connecting member 123 and leave the recessed opening 122. Meanwhile, the magnetic and mechanical fixing of the first connecting member 114 is released.

Back to FIG. 4, after the first machine body 110 is assembled to the second machine body 120, since electrical transmission between the first machine body 110 and the second machine body 120 is required, the first machine body 110 in this embodiment further includes a first electrical terminal 116 located at the first connecting member 114, and the second machine body 120 further includes a second electrical terminal 124 located at the second connecting member 123 (shown in FIG. 5). When the first connecting member 114 contacts the second connecting member 123, the first electrical terminal 116 contacts the second electrical terminal 124 so as to conduct the the second electrical terminal 124.

Of course, shapes of the first connecting member 114, and positions and forms of the first electrical terminal 116 and the second electrical terminal 124 are not limited to above. Several embodiments are further described in the following. It shall be noted that, in the following embodiments, like or similar components are represented by like or similar symbols, and like or similar descriptions are not repeated in the following.

Figure 7:
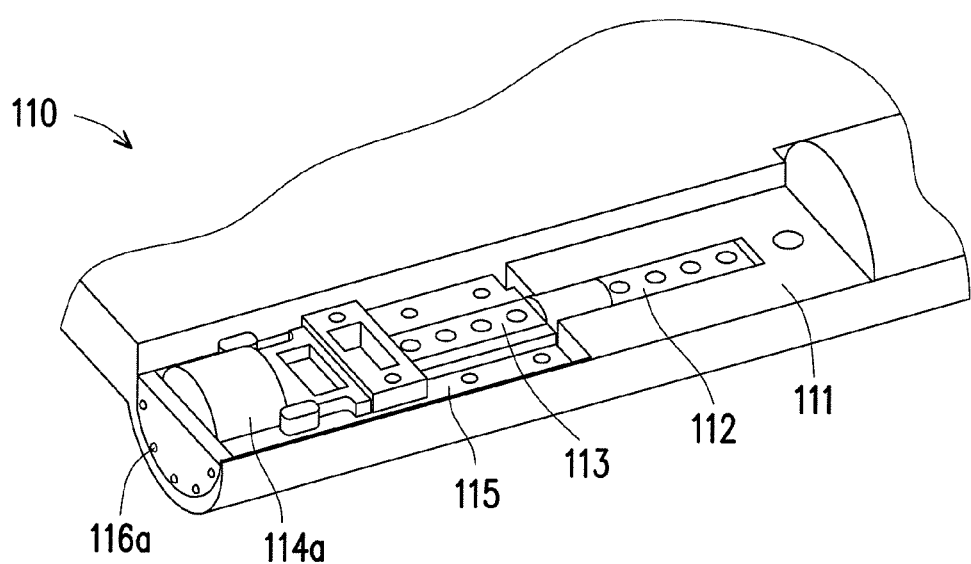
FIG. 7 is a schematic partial view illustrating a first machine body of an electronic device according to another embodiment of the invention.
Figure 8:
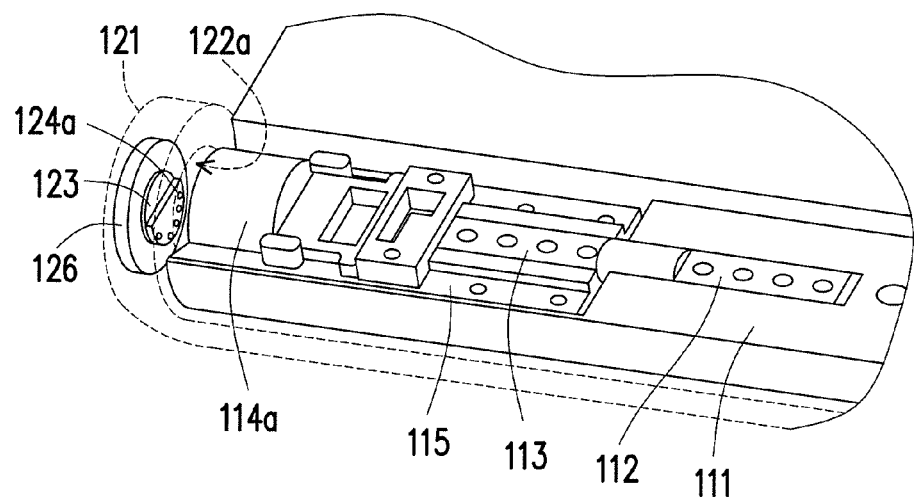
FIGS. 8 and 9 are schematic partial views illustrating a process of assembling the first machine body shown in FIG. 7 to the second machine body.
Figure 9:
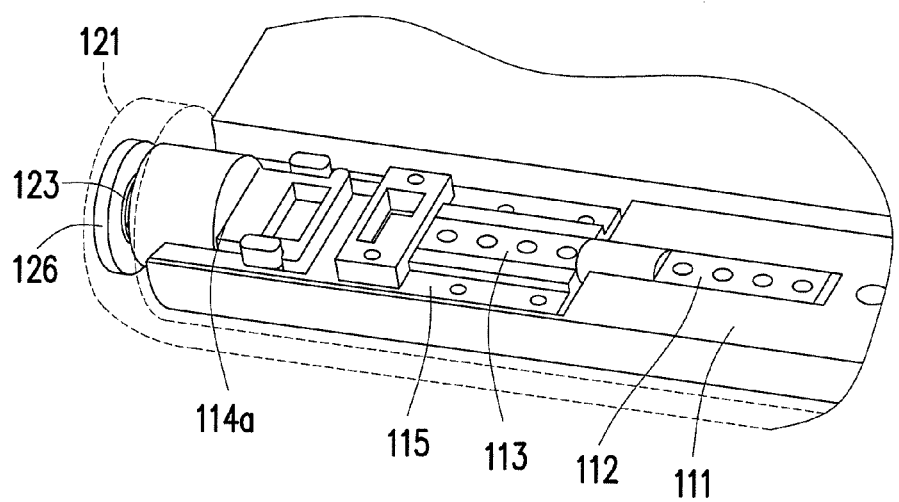

FIG. 7 is a schematic partial view illustrating a first machine body of an electronic device according to another embodiment of the invention. FIGS. 8 and 9 are schematic partial views illustrating a process of assembling the first machine body shown in FIG. 7 to the second machine body. Referring to FIGS. 7 to 9, in this embodiment, a shape of a cross section of a first connecting member 114a is a semi-circular shape, and a shape of a recessed opening 122a (shown in FIG. 8) of the second casing 121 corresponds to the shape of the first connecting member 121a for mechanical fastening. In addition, the first electrical terminal 116a is located at an outer side of the fixing member 115, and the first electrical terminal 116a is arranged in a semi-circular shape. The second electrical terminal 124a is located at a position on the second casing 121 corresponding to the first electrical terminal 116a, and the second electrical terminal 124a is arranged in a way corresponding to the first electrical terminal 116a. Of course, when the first machine body 110 is assembled to the second machine body 120, the first electrical terminal 116a may be connected with the second electrical terminal 124a.

Figure 10:
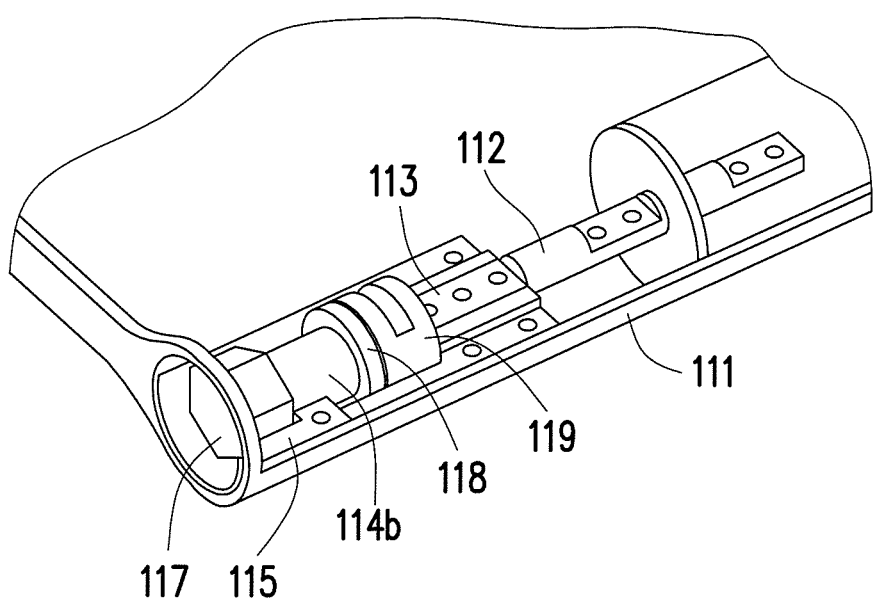
FIG. 10 is a schematic partial view illustrating a first machine body of an electronic device according to another embodiment of the invention.
Figure 11:
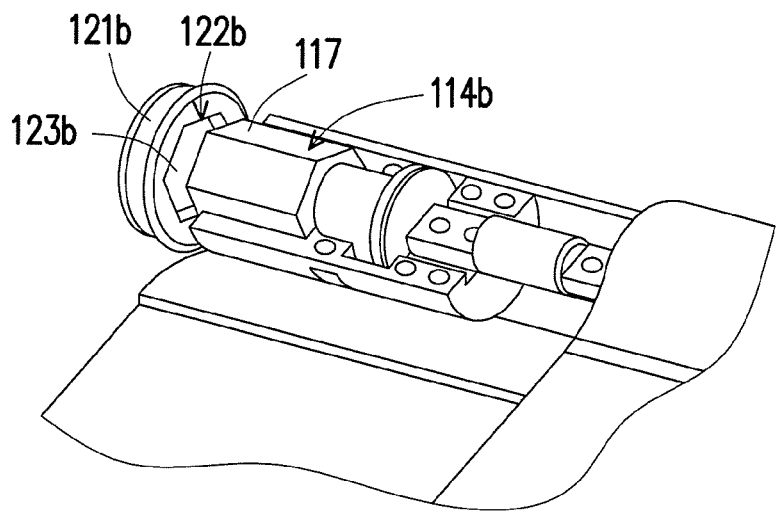
FIGS. 11 and 12 are schematic partial views illustrating a process of assembling the first machine body shown in FIG. 10 to the second machine body.
Figure 12:
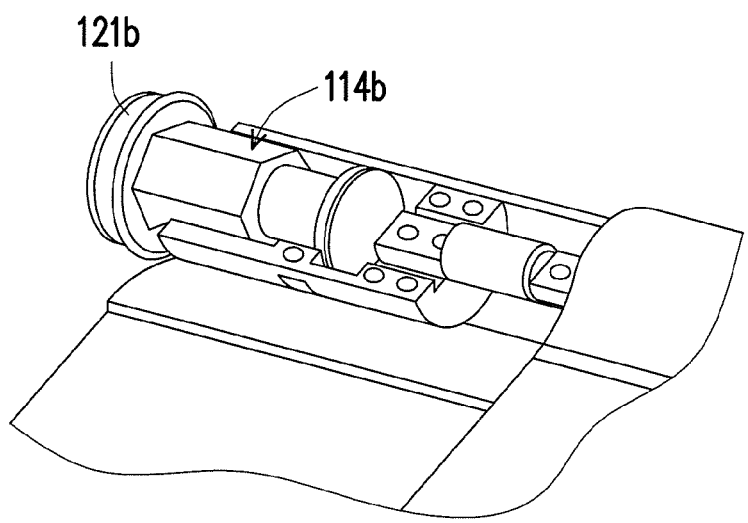

FIG. 10 is a schematic partial view illustrating a first machine body of an electronic device according to another embodiment of the invention. FIGS. 11 and 12 are schematic partial views illustrating a process of assembling the first machine body shown in FIG. 10 to the second machine body. Referring to FIGS. 10 to 12, in this embodiment, a first connecting member 114b includes a first end 117 and a second end 118 opposite to each other. The first end 117 is suitable for extending out of the first casing 111. A shape of a cross section of the first end 117 of the first connecting member 114b includes a polygonal shape. More specifically, the shape of the cross section of the first end 117 of the first connecting member 114b is a hexagon. A corresponding position at the second casing 121b also has a recessed opening 122b in a hexagon shape (shown in FIG. 11) for mechanical fastening.

In this embodiment, further to the first connecting member 114b and a second connecting member 123b that are two magnetic members attracting each other, the first machine body 110 further includes a restoring magnetic member 119 disposed beside the second end 118, as shown in FIG. 10. When the first machine body 110 is assembled to the second machine body 120, a magnetic attraction force of the second connecting member 123b with respect to the first connecting member 114b is greater than a magnetic attraction force of the restoring magnetic member 119 with respect to the first connecting member 114b, such that the first connecting member 114b is driven toward the second connecting member 123b. When the first machine body 110 is detached from the second machine body 120, the restoring magnetic member 119 attracts the first connecting member 114b, so as to restore the first connecting member 114b.

Of course, the first connecting member 114b is not necessarily fixed to the second connecting member 123b through magnetic attraction. The first connecting member 114b may also be fixed to the second connecting member 123b mechanically. Several embodiments are further described in the following.

Figure 13:
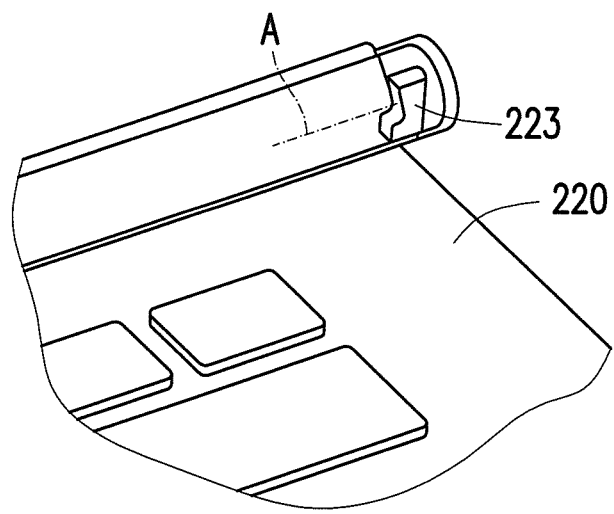
FIG. 13 is a schematic partial view illustrating a second machine body of an electronic device according to another embodiment of the invention.
Figure 14:
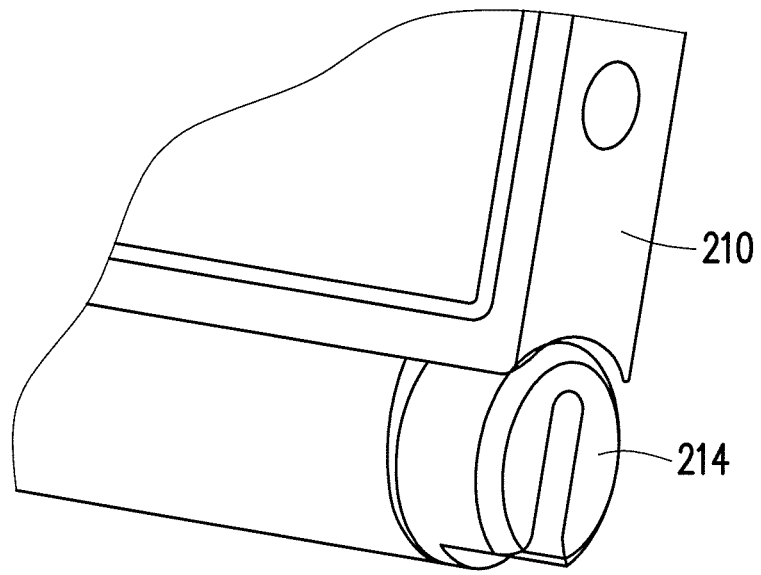
FIG. 14 is a schematic partial view illustrating the first machine body of the electronic device shown in FIG. 13.

FIG. 13 is a schematic partial view illustrating a second machine body of an electronic device according to another embodiment of the invention. FIG. 14 is a schematic partial view illustrating the first machine body of the electronic device shown in FIG. 13. Referring to FIGS. 13 and 14 together, in this embodiment, a second connecting member 223 of the second machine body 220 includes a protrusion part protruding along the axis A, and a first connecting member 214 of a first machine body 210 includes a recessed part corresponding to the protrusion part. In other words, the first connecting member 214 and the second connecting member 223 of this embodiment are fixed to each other through the protrusion and the recess in the mechanical structure. Of course, in other embodiments, the recessed part may be provided at the second connecting member 223 and the protrusion part may be provided at the first connecting member 214. In addition, in other embodiments, a shape of a cross section of the protrusion part includes a linear shape, a polygonal shape, a semi-circular shape, or a irregular shape. Shapes of the first connecting member 214 and the second connecting member 223 are not limited thereto, as long as the protruding part is fixed with the recessed part.

In the above embodiments, the first connecting members 114 and 214 are located on an end of the lower side of the first casing 111, and the second connecting members 123 and 223 are located on two sides of the second casing 121 and correspond to positions of the first connecting members 114 and 214. However, the positions of the first connecting members 114 and 214 and the second connecting members 123 and 223 on the first casing 111 and the second casing 121 are not limited thereto. In the following, an embodiment where the first connecting member is not directly located on one of a left end and a right end of the lower side of the first casing, but located at a position in a distance from the two ends of the lower side is introduced.

Figure 15:
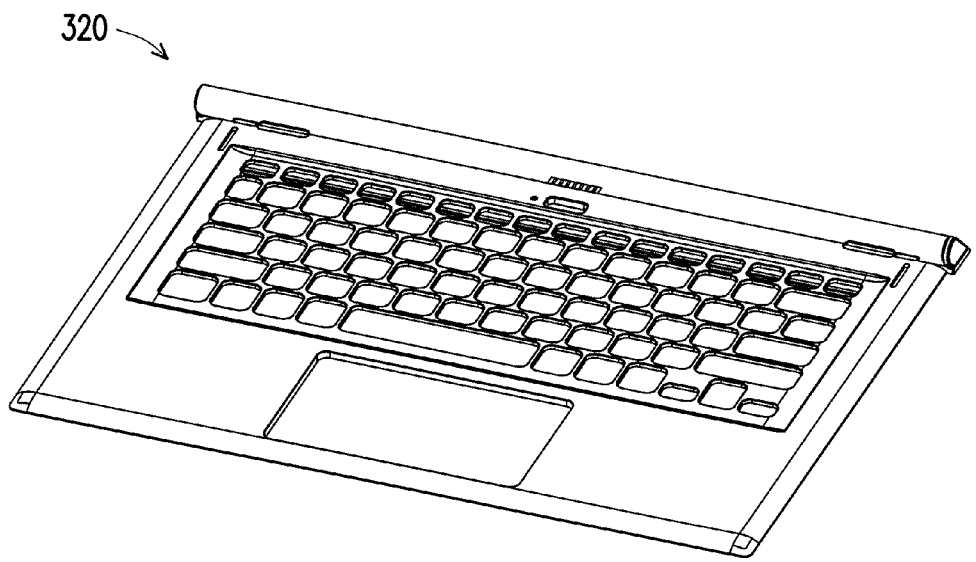
FIG. 15 is a schematic view illustrating a second machine body of an electronic device according to another embodiment of the invention.
Figure 16:
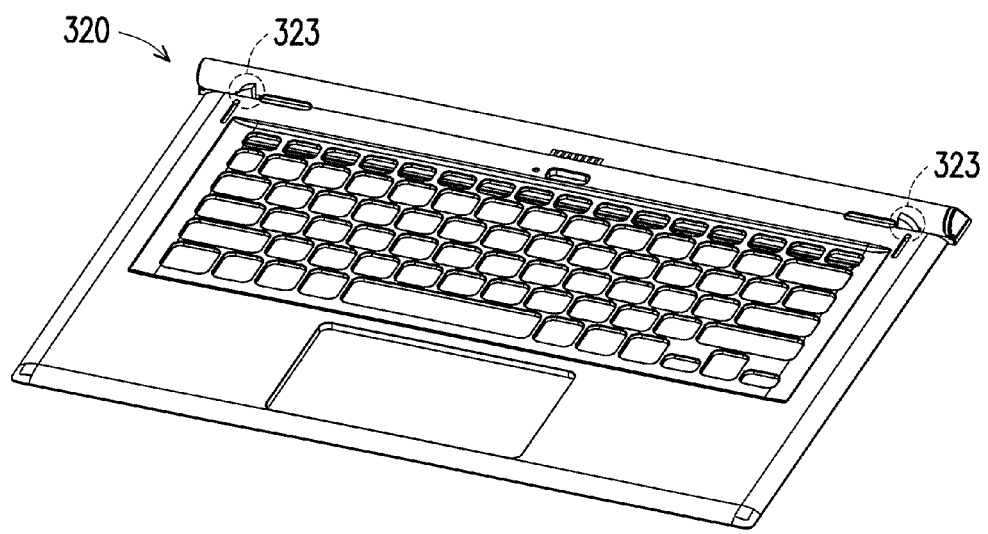
FIG. 16 is a schematic view illustrating a second connecting member of the second machine body shown in FIG. 15 being turned up.

FIG. 15 is a schematic view illustrating a second machine body of an electronic device according to another embodiment of the invention. FIG. 16 is a schematic view illustrating a second connecting member of the second machine body shown in FIG. 15 being turned up. Referring to FIGS. 15 and 16, when a first machine body 310 (shown in FIG. 23) is not assembled to a second machine body 320, a second connecting member 323 of the second machine body 320 shrinks into the second casing 321 (shown in FIG. 17). When the first machine body 310 is assembled to the second machine body 320, the second connecting member 323 of the second machine body 320 may be turned up and not covered by the second casing 321, so as to be fastened to a first connecting member 314 (shown in FIG. 17). Further descriptions are provided in the following.

Figure 17:
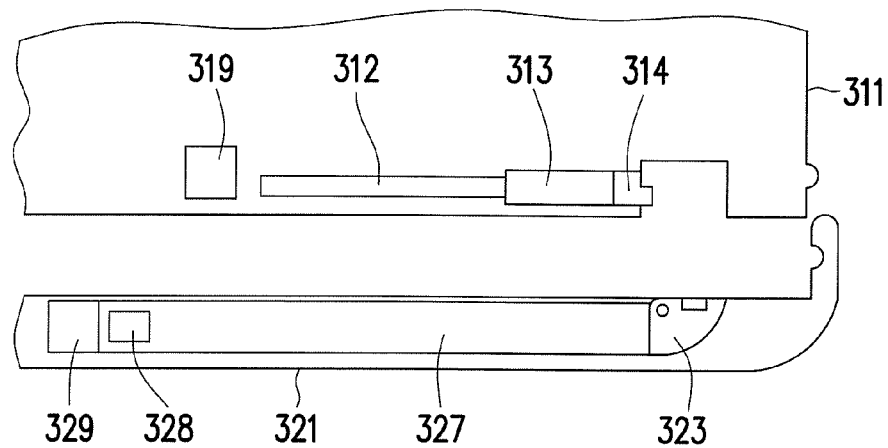
FIG. 17 is a schematic cross-sectional view illustrating a first machine body not assembled to a second machine body.
Figure 18:
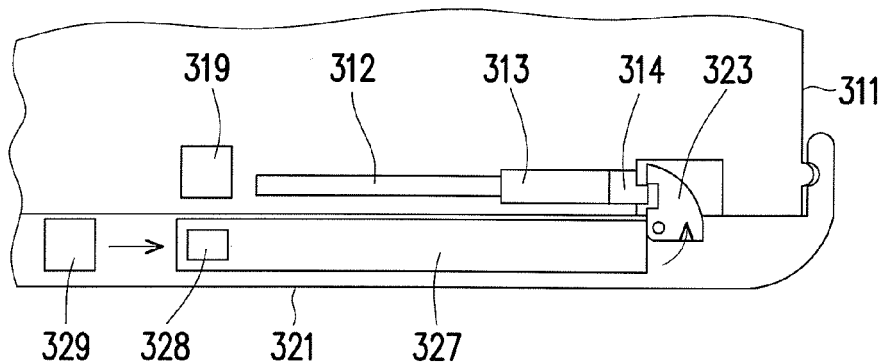
FIG. 18 is a schematic cross-sectional view illustrating a first machine body assembled to a second machine body.

FIG. 17 is a schematic cross-sectional view illustrating a first machine body not assembled to a second machine body. FIG. 18 is a schematic cross-sectional view illustrating a first machine body assembled to a second machine body. Referring to FIG. 17, in this embodiment, the first machine body 310 (shown in FIG. 23) includes a first magnetic member 319. The first magnetic member 319 is embedded in the first casing 311. The first connecting member 314 is fixed to a second hinge 313 and includes a slot. The first casing 311 includes a hole, and the slot of the first connecting member 314 is located in the hole. The second machine body 320 includes a second connecting member 323, a rod 327, a second magnetic member 328, and a third magnetic member 329. The second connecting member 323 is a locking hook and pivoted to the second casing 321. When the first machine body 310 is detached from the second machine body 320, the second connecting member 323, the rod 327, the second magnetic member 328, and the third magnetic member 329 are sequentially arranged in order on the same axis, and the second magnetic member 328 is attracted by the third magnetic member 329.

As shown in FIG. 18, when the first machine body 310 is assembled to the second machine body 320, a magnetic attraction force between the first magnetic member 319 and the second magnetic member 328 is greater than a magnetic force between the second magnetic member 328 and the third magnetic member 329, such that the second magnetic member 329 moves toward the rod 329 (i.e., the right side of the drawing). The rod 327 pushes the second connecting member 323, such that the second connecting member 323 rotates to a position protruding from the second casing 321 and is inserted into the hole and fixes the first connecting member 314. In this way, the first hinge 312 may rotate relative to the second hinge 313.

Figure 19:
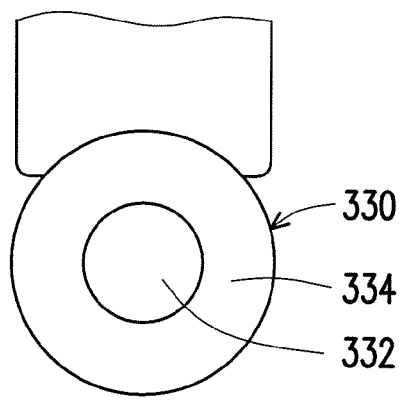
FIGS. 19-21 are schematic partial views illustrating side end parts of first machine bodies of a plurality of electronic devices according to other embodiments of the invention.
Figure 20:
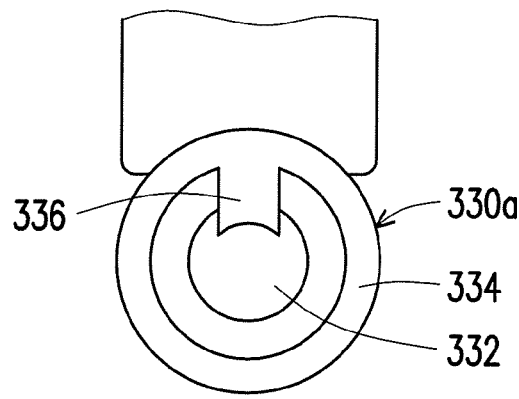
Figure 21:
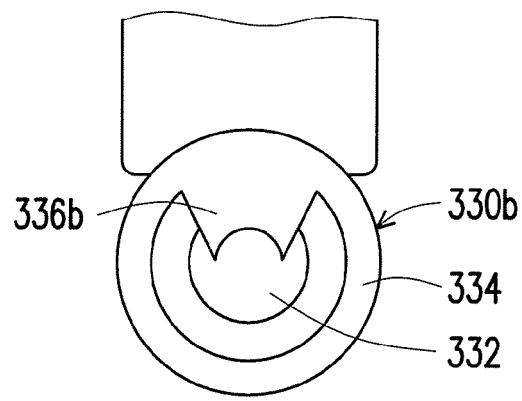

In addition, when the first connecting member 314 as shown in FIGS. 17 and 18 is not located at one of a left end and a right end on a lower side of the first casing 311, a design making the left end and the right end of the lower side of the first casing 311 easier to be positioned to the second casing 321 may be adopted. FIGS. 19-21 are schematic partial views illustrating side end parts of first machine bodies of a plurality of electronic devices according to other embodiments of the invention. Referring to FIG. 19, in this embodiment, the side of the first casing 311 includes a positioning part 330 at one of the left end and the right end of the side. The positioning part 330 includes a spherical bump 332 at the center and a peripheral area 334 at a periphery of the spherical bump 332. In this embodiment, the spherical bump 332 is suitable to rotate relative to the peripheral area 334. When the first machine body 310 is assembled to the second machine body 320, the rotatable spherical bump 332 may reduce a friction force of the first casing 311 rotating relative to the second casing 321. Of course, in other embodiments, it is also viable that the spherical bump 332 do not rotate relative to the peripheral area 334.

Referring to FIG. 20, in this embodiment, the positioning part 330 further includes a guiding bump 336 located at the peripheral area 334. The guiding bump 336 serves to guide a direction according to which the first casing 311 is inserted into the second casing 321. Referring to FIG. 21, a difference between FIG. 21 and FIG. 20 lies in that, in this embodiment, a width of the guiding bump 336 gradually decreases toward the spherical bump 332.

Figure 22:
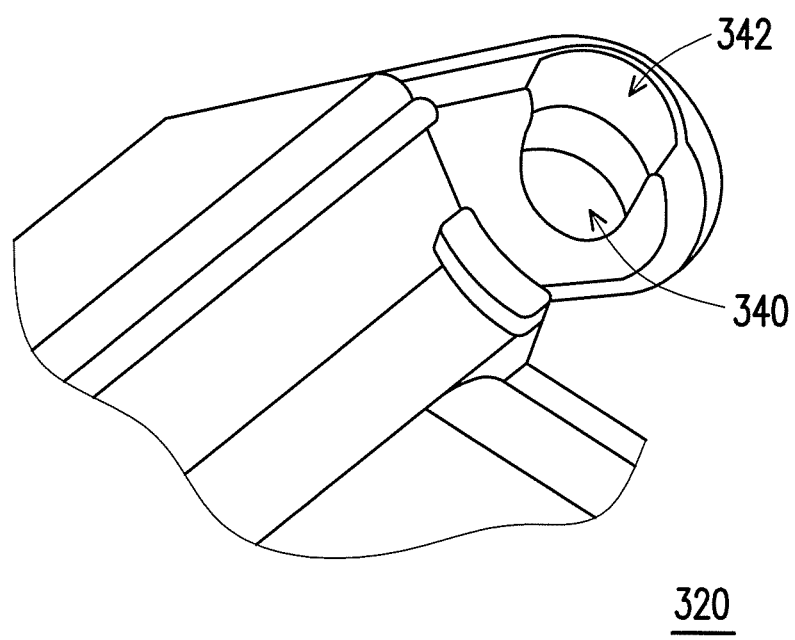
FIG. 22 is a schematic partial view illustrating a second machine body of the electronic device shown in FIG. 21.
Figure 23:
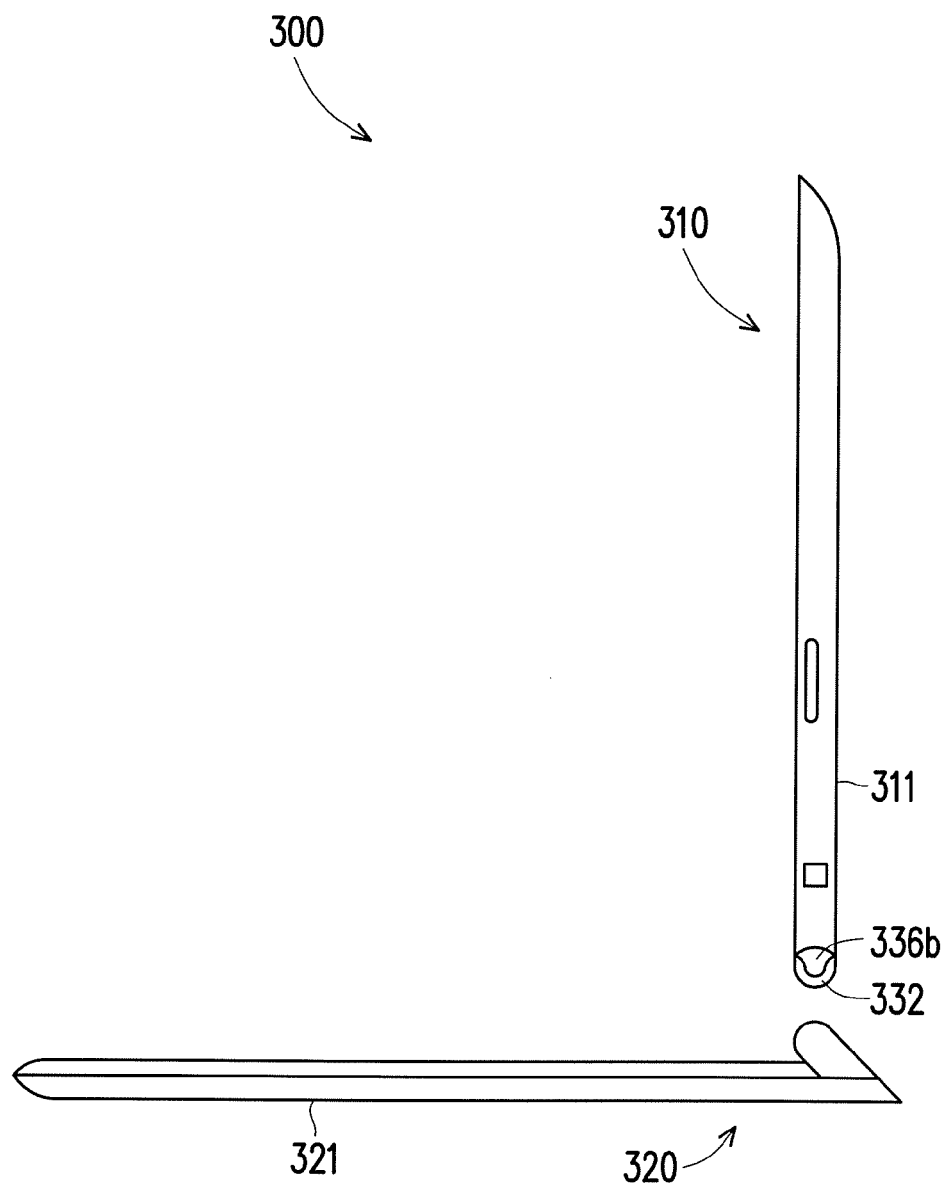
FIG. 23 is a schematic view illustrating the first machine body shown in FIG. 21 inserted into the second machine body shown in FIG. 22.

FIG. 22 is a schematic partial view illustrating a second machine body of the electronic device shown in FIG. 21. Referring to FIG. 22, the second casing 321 includes a fixing groove 340 corresponding to the positioning part 330 and a guiding track 342 connected to the fixing groove 340. The fixing groove 340 and the guiding track 342 of this embodiment correspond to the spherical bump 332 and the guiding bump 336b shown in FIG. 21 and are provided to allow the guiding bump 336b and the spherical bump 332 to side into the guiding track 342 and the fixing groove 340. A width of the guiding track 342 may also gradually decrease in correspondence with the width of the guiding bump 336b. FIG. 23 is a schematic view illustrating the first machine body shown in FIG. 21 inserted into the second machine body shown in FIG. 22. Referring to FIG. 23, the guiding bump 336b of the positioning part 330 of the first casing 311 may be assembled to the second casing 321 in a specific direction (e.g., perpendicular to the drawing) along an extending direction of the guiding track 342.

It should be noted that the design of the positioning part 330 and the fixing groove 340 of this embodiment may also be applied in other embodiments of the invention. In the embodiment where the first connecting member 114 is located at an end of the lower side of the first casing 111, the positioning part 330 may be applied at the other end of the lower side of the first casing 111.

Figure 24:
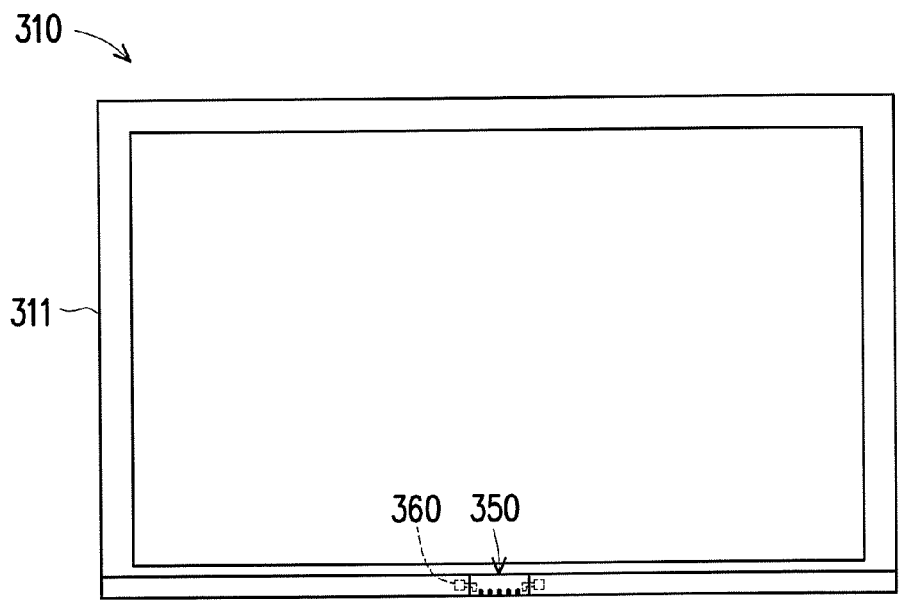
FIG. 24 is a schematic view illustrating a first machine body of an electronic device according to another embodiment of the invention.
Figure 25:
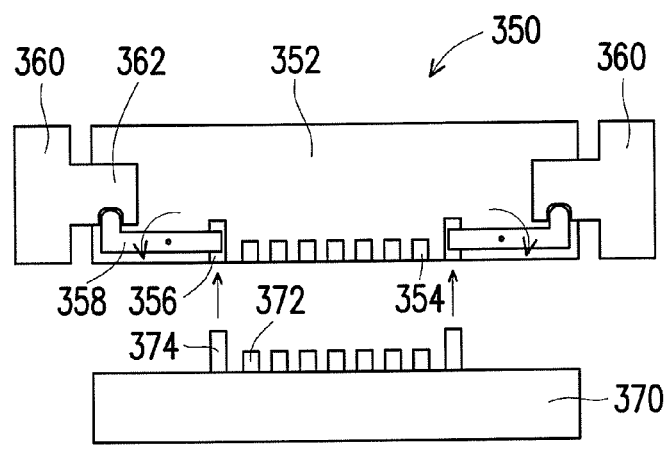
FIG. 25 is a schematic view illustrating the first machine body shown in FIG. 24 inserted into a second machine body.

In addition, positions of the first electrical terminals 116 and 116a of the first machine body 110 and the second electrical terminals 124 and 124a of the second machine body 120 are not limited to those shown in FIGS. 4, 5, 7, and 8. FIG. 24 is a schematic view illustrating a first machine body of an electronic device according to another embodiment of the invention. FIG. 25 is a schematic view illustrating the first machine body shown in FIG. 24 inserted into a second machine body. Referring to FIGS. 24 and 25, in this embodiment, the first machine body 310 further includes a first electrical connector 350 and a holding member 360. The first electrical connector 350 is disposed at a central position of the lower side of the first casing 311. The first electrical connector 350 includes a casing stand 352, a first electrical terminal 354 not covered by the casing stand 352, a recess 356 recessed in the casing stand 352 and a first fastening part 358 pivotally disposed in the casing stand 352. The first electrical connector 350 is pivoted to the first casing 311 and suitable for rotating relative to the first casing 311.

The holding member 360 is fixed in the first casing 311 and located beside the first electrical connector 350. In addition, the holding member 360 includes a second fastening part 362. The second machine body 320 includes a second electrical connector 370. The second electrical connector 370 includes a second electrical terminal 372 and a pressing part 374.

When the first machine body 310 is detached from the second machine body 320, the first fastening part 328 is fastened to the second fixing part 362, and the first electrical connector 350 is fixed to the holding member 360. When the first machine body 310 is assembled to the second machine body 320, the pressing part 374 is inserted into the recess 356 and pressed to the first fastening part 358. The first fastening part 358 rotates to be detached from the second fastening part 362, such that the first electrical connector 350 is suitable for rotating relative to the holding member 362.

Thus, when the first machine body 310 is detached from the second machine body 320, the holding member 360 fixes the first electrical connector 350, such that the first electrical connector 350 does not arbitrarily rotate, thereby making it easy to connect the first electrical connector 350 and the second electrical connector 370. When the first machine body 310 is assembled to the second machine body 320, the pressing part 374 is inserted into the recess 356 and pressed to the first fastening part 358, such that the first fastening part 358 rotates to be detached from the second fastening part 362. Accordingly, the holding member 362 is able to rotate relative to the first electrical connector 350. In this way, during rotation of the first casing 311, the first electrical connector 350 connected to the second electrical connector 370 of the second machine body 320 does not rotate together with the first casing 311, so the first electrical connector 350 and the second electrical connector 370 are able to maintain a preferable electrical transmission state.

Of course, in other embodiments, the holding member 360 may be omitted, as long as the user manually rotates the first electrical connector 350 to a position right beneath in advance when assembling the first machine body 310 to the second machine body 320. It should be noted that the design of the first electrical connector 350 and the second electrical connector 370 of this embodiment may also be applied in other embodiments.

In view of the foregoing, the first hinge and the second hinge of the first machine body of the electronic device according to the embodiments of the invention are covered by the first casing. When the first machine body is not combined to the second machine body, the first hinge and the second hinge do not rotate relative to each other due to a friction force between the first hinge and the second hinge. After the first machine body is assembled to the second machine body, since the first connecting member of the first machine body is fixed by the second connecting member, the second hinge is jointly fixed. Under such circumstance, when the user exerts a force to rotate the first casing and overcomes the friction force between the first hinge and the second hinge, the first hinge may rotate relative to the second hinge, such that the first casing may rotate relative to the second casing. In other words, the first hinge and the second hinge are rotatable relative to each other when the first machine body of the electronic device according to the embodiments of the invention is assembled to the second machine body. Therefore, when the first machine body of the electronic device according to the embodiments of the invention is not assembled to the second machine body, the first hinge and the second hinge do not arbitrarily rotate. In addition, since the first hinge and the second hinge are covered by the first casing, the appearance of the first machine body is more compact.

It will be apparent to those skilled in the art that various modifications and variations can be made to the structure of the disclosure without departing from the scope or spirit of the disclosure. In view of the foregoing, it is intended that the disclosure cover modifications and variations of the disclosure provided they fall within the scope of the following claims and their equivalents.

What is claimed is:

1. An electronic device, comprising:
   a first machine body, comprising:
      a first casing;
      a first hinge, fixed to a side of the first casing;
      a second hinge, pivoted to the first hinge along an axis, wherein the first hinge and the second hinge are covered by the first casing;
      a first connecting member, located at the side of the first casing and linked to the second hinge; and
   a second machine body, suitable to be detachably assembled to the first machine body, wherein the second machine body comprises:
      a second casing;
      a second connecting member, disposed at the second casing, wherein,
   when the first machine body is assembled to the second machine body, the first connecting member is fixed by the second connecting member, and the second hinge is fixed jointly, such that the first hinge is suitable for rotating relative to the second hinge, making the first casing suitable for rotating relative to the second casing,
   wherein the first machine body further comprises a fixing member fixed to the second hinge, the first connecting member is movably disposed to the fixing member along the axis, the first connecting member and the second connecting member are respectively two magnetic members attracting each other, and when the first machine body is assembled to the second machine body, the second connecting member attracts the first connecting member to fix relative positions of the first connecting member and the second machine body.

2. The electronic device as claimed in claim 1, wherein one of the first machine body and the second machine body is a tablet computer, and the other of the first machine body and the second machine body is an expansion dock.

3. The electronic device as claimed in claim 1, wherein the first connecting member is located at one of a left end and a right end of the side of the first casing.

4. The electronic device as claimed in claim 1, wherein the second casing comprises a recessed opening, the second connecting member is located beside the recessed opening, and when the first machine body is assembled to the second machine body, the first connecting member is inserted into the recessed opening and fastened to the second casing.

5. The electronic device as claimed in claim 1, wherein a shape of a cross section of the first connecting member comprises a linear shape, a polygonal shape, and a semi-circular shape.

6. The electronic device as claimed in claim 1, wherein the first machine body further comprises a first electrical terminal located at an outer side of the fixing member, the second machine body further comprises a second electrical terminal located at the second casing at a position corresponding to the fixing member, and when the first machine body is assembled to the second machine body, the first electrical terminal is connected to the second electrical terminal.

7. The electronic device as claimed in claim 1, wherein the first machine body further comprises the first electrical terminal located at the first connecting member, and the second machine body further comprises the second electrical terminal located at the second connecting member.

8. The electronic device as claimed in claim 1, wherein the second machine body comprises a button located on the second casing, and when the first machine body is assembled to the second machine body, the button is suitable to be pressed to the first connecting member to make the first connecting member detached from the second connecting member.

9. The electronic device as claimed in claim 1, wherein the first machine body further comprises a first electrical connector comprising a casing stand and a first electrical terminal not covered by the casing stand, the first electrical connector is pivoted to the first casing and suitable for rotating relative to the first casing, and the second machine body comprises a second electrical connector comprising a second electrical terminal.

10. The electronic device as claimed in claim 9, wherein the first machine body further comprises a holding member, the holding member is fixed inside the first casing and located beside the first electrical connector, the first electrical connector further comprises a recess recessed in the casing stand and a first fastening part pivotally disposed at the casing stand, the holding member comprises a second fastening part, and the second electrical connector further comprises a pressing part, when the first machine body is detached from the second machine body, the first fastening part is fastened to the second fastening part, and the first electrical connector is fixed to the holding member, and when the first machine body is assembled to the second machine body, the pressing part is inserted into the recess and pressed to the first fastening part, and the first fastening part rotates to be detached from the second fastening part, such that the first electrical connector is suitable for rotating relative to the holding member.

* * * * *